(12) United States Patent
Ramanadin et al.

(10) Patent No.: US 8,832,471 B2
(45) Date of Patent: Sep. 9, 2014

(54) POWER MANAGEMENT SYSTEM UTILIZING A TRANSACTION TERMINATOR

(75) Inventors: Bernard Ramanadin, Crolles (FR); Tedder Meng, Shanghai (CN); Wei Tao Wang, Shanghai (CN); Robert (Yanxim) Chen, Shanghai (CN); Gabriel Duffy, Grenoble (FR)

(73) Assignee: ST-Ericsson SA, Plan-les-Ouates (CH)

( * ) Notice: Subject to any disclaimer, the term of this patent is extended or adjusted under 35 U.S.C. 154(b) by 262 days.

(21) Appl. No.: 13/387,066

(22) PCT Filed: Jul. 23, 2010

(86) PCT No.: PCT/EP2010/060755
§ 371 (c)(1),
(2), (4) Date: Jan. 25, 2012

(87) PCT Pub. No.: WO2011/012558
PCT Pub. Date: Feb. 3, 2011

(65) Prior Publication Data
US 2012/0137145 A1    May 31, 2012

(30) Foreign Application Priority Data
Jul. 28, 2009   (FR) ..................... 09 55284

(51) Int. Cl.
| | |
|---|---|
| G06F 1/00 | (2006.01) |
| G06F 1/32 | (2006.01) |
| H03K 17/16 | (2006.01) |
| H04L 12/403 | (2006.01) |
| G06F 11/14 | (2006.01) |

(52) U.S. Cl.
CPC .......... *H04L 12/403* (2013.01); *G06F 11/1441* (2013.01)

USPC .............................. 713/300; 713/320; 326/30

(58) Field of Classification Search
CPC ...................................... G06F 1/3203
USPC ......................................... 713/300
See application file for complete search history.

(56) References Cited

U.S. PATENT DOCUMENTS

| | | | |
|---|---|---|---|
| 4,637,022 A | 1/1987 | Burke et al. | |
| 4,955,075 A | 9/1990 | Anderson | |
| 5,455,523 A * | 10/1995 | Wallace et al. | 326/30 |
| 5,680,555 A * | 10/1997 | Bodo et al. | 710/306 |
| 6,590,907 B1 | 7/2003 | Jones et al. | |
| 6,684,343 B1 | 1/2004 | Bouchier et al. | |
| 7,228,457 B2 * | 6/2007 | Allue et al. | 714/27 |
| 8,405,254 B2 * | 3/2013 | Kitano | 307/116 |

FOREIGN PATENT DOCUMENTS

| | | |
|---|---|---|
| EP | 1357479 A2 | 10/2003 |
| JP | 2002014939 A | 1/2002 |

* cited by examiner

*Primary Examiner* — Suresh Suryawanshi
(74) *Attorney, Agent, or Firm* — Coats & Bennett, P.L.L.C.

(57) ABSTRACT

A system comprises a central processing unit (10), an interconnection bus (1), and a plurality of functional modules (11-15, 21) corresponding to distinct power domains and able to communicate with each other and/or with the central processing unit via the bus. At least one of the power domains, and is configured to be substituted for a slave functional module (21) of the power domain when the power to the power domain is turned off by the central processing unit. It signals an error in response to any request of a transaction that is in progress between the slave functional module and a master functional module at the moment the power is turned off.

11 Claims, 6 Drawing Sheets

POWER MANAGEMENT SYSTEM UTILIZING A TRANSACTION TERMINATOR

TECHNICAL FIELD

This invention relates in general to the field of integrated circuit systems such as systems-on-chip or SoC. It more particularly concerns the closure of a transaction in progress when the power is cut off to a power domain in such a system.

The invention has particular applications in portable electronic devices, such as mobile telephones, which are battery-powered and in which efficient power management is desirable in order to increase the autonomy of the device.

TECHNOLOGICAL BACKGROUND

In systems-on-chip in particular, functional modules dedicated to handling certain functions of the system are connected to each other and/or to a central processing unit (CPU) via an interconnection bus. This bus ensures the communication of control information and data between the CPU and the functional modules and/or directly between the functional modules, using a determined protocol. This protocol can be sequential or combinational. If sequential, a transaction between a master module and a slave module occurs by exchanging messages called requests and responses. In the second case, the transaction occurs through the use of logic signals, which are set to high or low by logic units using ad-hoc logic gates.

To implement a power management for the system which lowers the total power consumption, the system is organized into separate and independent power domains. The electrical power supplied to such a domain can therefore be turned off independently from the other domains. Each power domain comprises at least one functional module. The number of functional modules in a given power domain is not limited, but is low compared to the total number of functional modules of the system to allow flexible power management.

For example, in a mobile telephone, a functional module dedicated to listening for the beacon radio frequency signal transmitted by the cellular network receives power most of the time. Conversely, a functional module dedicated to reading and decoding audio data in MP3 format may be powered off for a large percentage of the time, when the corresponding function is not requested by the user. This decreases the chip's static power consumption (to which leakage currents also contribute), saving battery power and increasing the autonomy of the device.

Turning off the power to a given domain is decided by the CPU. At the moment when the power to a functional module is cut off, the module could be engaged in a transaction with another functional module without the CPU being aware of this. This is particularly the case for slave modules, which respond directly to requests from master modules.

When a functional module is powered off, a situation may result in which the other functional module continues to wait for a response that will never come. This can cause the system to hang if the communication protocol is not robust against such situations, requiring a complete reinitialization.

U.S. Pat. No. 6,590,907 describes the use of a routing and arbitration logic which is situated in the interconnection bus (called the "packet router" in the document), and which responds to a request addressed by a master module to an additional module, when said additional module is not present at an expansion port where the master module expects it to be connected. The response consists of issuing an error message.

This solution enables the presence of expansion ports for the possible connection of additional functional modules in certain applications of the system, and avoids the system hanging when a request is addressed to a packet router port associated with a functional module which is not present. This provides a solution to a problem which is different than the one the present invention aims to resolve, and also presents difficulties when implemented with a high number of power domains.

SUMMARY OF THE INVENTION

There is therefore a need for a more effective solution for satisfactorily terminating a transaction in progress with a functional module which has its power cut off.

In a first aspect of the invention, some embodiments propose a system comprising:
   a central processing unit;
   an interconnection bus;
   a plurality of functional modules corresponding to distinct power domains, said modules able to communicate with each other and/or with the central processing unit via the bus; and,
   at least one slave module associated with one of the power domains, configured to be substituted for a slave functional module of said power domain when the power to said power domain is turned off by the central processing unit and to signal an error in response to any request of a transaction that is in progress between the slave functional module and a master functional module at the moment the power is turned off.

In this manner, even if power is turned off to a slave functional module during the processing of a transaction in progress between this module and a master functional module, the master module receives an error message which allows it to handle the situation resulting from the unavailability of the slave module. The system will therefore not hang while awaiting a response.

The system may be distributed across multiple integrated circuits. Typically, however, it is realized as a system-on-chip (SoC).

In one embodiment, the associated slave module comprises a first logic unit for producing a response signaling an error if a read operation is in progress at the moment the power is turned off, and does so for the entire period of the read response expected by the master functional module.

From a protocol point of view, this all appears to the master functional module as if the slave functional module is still powered on and is signaling an error instead of read data, i.e. for the entire period of the read response expected by the master functional module.

Additionally or alternatively, the associated slave module comprises a second logic unit for producing a response signaling an error if a write operation is in progress at the moment the power is turned off, and does so at the end of receiving the write request regardless of the moment when the power to the slave functional module is turned off during the current transaction.

From a protocol point of view, this all appears to the master functional module as if the slave functional module is still powered on and is signaling an error immediately after receiving the write request.

The interconnection bus can support a combinational communication protocol, and in this case the error can be signaled by activation of an error signal in compliance with said protocol.

If the interconnection network supports a sequential communication protocol, the error can be signaled in the form of an error message in compliance with said protocol.

A second aspect of the invention proposes a method of power management process for a system-on-chip comprising a central processing unit, an interconnection bus, and a plurality of functional modules corresponding to distinct power domains, said modules being able to communicate with each other and/or with the central processing unit via the bus, wherein a slave module associated with one of the power domains is substituted for a slave functional module of said power domain when the power to said power domain is turned off by the central processing unit, and signals an error in response to any request of a transaction that is in progress between the slave functional module and a master functional module at the moment the power is turned off.

A third aspect of the invention also concerns an electronic device comprising a system-on-chip according to the first aspect. Typically this can be a mobile telephone or any other battery-powered device in which the energy of the power source must be conserved by power management.

Advantageously, the embodiments of the invention do not increase in complexity as the number of power domains increases in the system. In other words, the proposed solution is compatible with a large number of power domains.

It also does not require any significant change in the design of the circuit when a given version is upgraded to meet the needs of a new application which involves increasing the number of power domains, for example when adding a functionality to an existing chip.

Lastly, it can be used to update existing circuits which do not yet implement it, with little modification to their internal architecture.

BRIEF DESCRIPTION OF DRAWINGS

Other features and advantages of the invention will be apparent from the following detailed description. This description is purely illustrative and is to be read with reference to the attached drawings, in which.

DESCRIPTION OF EMBODIMENTS

Embodiments of the invention will now be described with reference to the attached drawings, in an exemplary system-on-chip which uses a sequential communication protocol called AXI™. The specifications of this protocol, which was proposed by the company ARM Limited, are freely accessible in a public open standard document referred to hereinafter as the AXI Specification, entitled "*AMBA Advanced eXtensible Interface (AXI) Protocol Specification*", Version 1.0, Ed. B, Mar. 19, 2004, to which the reader is invited to refer to the extent that would be necessary.

This example is not limiting. Embodiments of the invention can apply to other sequential protocols, such as the STBus™ of STMicroelectronics, and to combinational protocols such as APB™ (Advanced Peripheral Bus) or AHB™ (Advanced High-performance Bus) which are other protocols in the AMBA™ architecture (Advanced Microcontroller Bus Architecture) of ARM Limited, or, as another example, the NoC (Network on Chip) protocol.

The system described here can be realized using 45-nm CMOS technology (for the hardware) and the Verilog™ description language (for the software).

Figure 1:
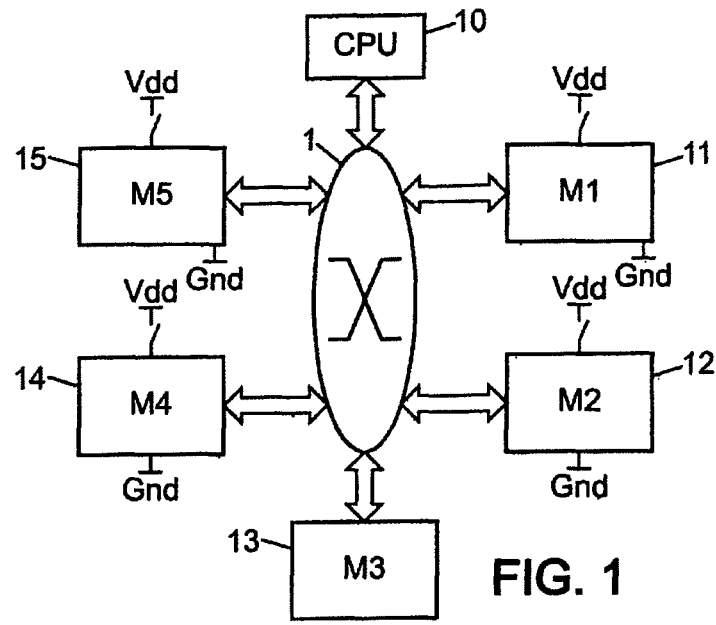
FIG. 1 is a block diagram of a system-on-chip.

FIG. 1 illustrates the architecture of a system-on-chip.

The system comprises functional modules 11, 12, 13, 14 and 15, each respectively associated with a function of the system. These modules can be, for example, an internal memory, an external memory management unit, an MP3 decoder for reading audio data, an MPEG decoder for reading video data, a USB interface management unit, a display management unit, etc. These modules can be master modules, slave modules, or either one depending on the context. For example, an MP3 decoder can be in master mode to access an internal memory operating in slave mode in order to read the data to be decoded.

The system also comprises a central processing unit 10, or CPU, which manages the entire system.

These different elements communicate by means of an interconnection bus 1, to which they are respectively coupled via an appropriate interface (not represented). Each transaction comprises the sending of a request message by the master module, and the return of a response message by the slave module. These message comprise, as arguments, a source identifier and a destination identifier, or addresses, which are used to route the messages across the bus 1 between the respective interfaces of the master module and the slave module involved in the transaction.

To simplify the following description, each functional module will be considered as corresponding to one particular power domain. In other words, a power domain here only comprises one functional module. It is understood, of course, that more than one functional module can be part of a power domain without modifying the principle described.

To implement the silicon chip, an on-chip power grid is defined which selectively provides a supply voltage Vdd to the module. A ground plane connects all the functional modules to a ground potential Gnd, or common ground.

It is the CPU that decides when to turn off the power to a particular domain based on given criteria, which it is unnecessary to detail here, in order to conserve battery power.

For at least one of the power domains of the system, the system comprises a particular module, referred to as the "terminator" module, associated with said power domain. This terminator module is arranged and configured to be substituted for the functional module in the power domain concerned, and to terminate any transaction that may be in process with said functional module at the moment the power is turned off. It operates in slave mode only. Termination of the transaction comprises, in the example considered here, sending an error message SLVERR (as defined in paragraph 7.2.3 of the AXI Specification) to the master module that initiated the transaction. Providing this error message allows the master module to continue to execute its process in a completely conventional manner, taking into account the unavailability of the slave functional module.

Preferably, the system comprises a terminator for each power domain in which there is at least one slave functional module. This ensures that the system will never hang while awaiting a response. But the advantages of the invention are already obtained when at least one power domain of the system is protected by a terminator.

Also preferably, a terminator is exclusively associated with a power domain. In other words, a terminator is provided for at most one power domain. This simplifies its design.

For example, a terminator T1 is associated with a functional module M1, a terminator T2 is associated with a functional module M2, . . . a terminator Ti is associated with a functional module M1, . . . , where i is an index designating one of the power domains corresponding to the functional modules of the system.

Before describing in more detail the design and operation of the terminator, we will first describe how it and the functional module of the power domain with which it is associated are arranged together.

Figure 2:
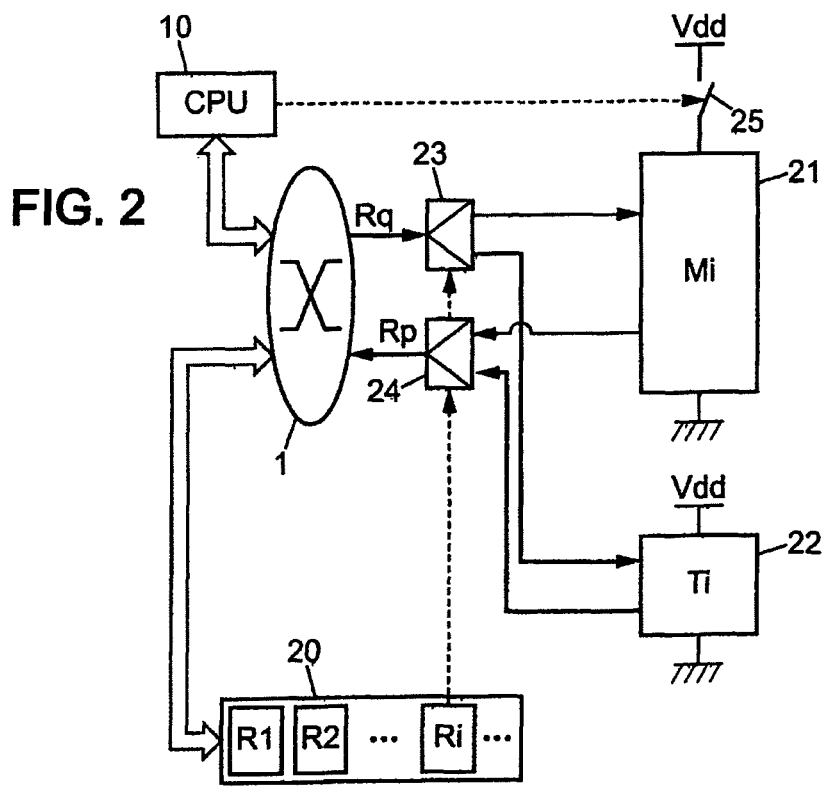
FIG. 2 is a block diagram illustrating the selective coupling to the system bus of a slave functional module and its associated terminator module.

In FIG. 2, a terminator module 22 (Ti) is associated with a functional module 21 (Mi) whose power can be selectively turned off by the CPU 10. This is illustrated by the control signal represented as a dotted line between the CPU and a switch controlling the supply voltage Vdd to the module 21.

To simplify the representation of the coupling of the module 21 to the interconnection bus 1, it is assumed that this module can only operate in slave mode. However, the following description is entirely compatible with this module 21 operating in master mode. In the latter case, the coupling to the bus 1 simply must be completed relative to what follows, without the other added elements being involved in the connection of the terminator 22.

In the example, the module 21 is coupled to the bus 1 through a demultiplexer 23 in order to receive a request message Rq, and through a multiplexer 24 in order to return a response message Rp. The terminator 22 is also coupled to the demultiplexer 23 in order to receive the message Rq in place of the module 21 when so signaled by the demultiplexer. Similarly, the terminator 22 is also coupled to the multiplexer 24 in order to send the response message Rp to the bus 1 in lieu of the module 21 when so signaled by the multiplexer.

More particularly, the demultiplexer 23 is a combination of logic gates with one input coupled to the bus 1 and two outputs respectively coupled to the module 21 and the terminator 22. The multiplexer 24 is a combination of logic gates with two inputs respectively coupled to the module 21 and the terminator 22, and one output coupled to the bus 1. The coupling to the bus 1 can be done through an interface (not represented in FIG. 2) which ensures that the correct power levels are supplied.

The system also comprises an array of registers 20, in which there is one register per power domain. Therefore we have registers R1, R2, . . . , Ri, . . . etc. The CPU can write the value stored in these registers, for example by obtaining write access to the array of registers 20, via the bus 1, by initiating a write request. For example, if there is a number N of power domains, such that there are N registers in the array of registers 20, the value to be written is an N-bit value, with each bit respectively associated with a power domain. In a variant, the CPU can write directly to the array of registers without using the bus, if control plane connections exist which allow it to do so directly.

The binary value stored in the register Ri associated with the functional module M1, denoted 21 in FIG. 2, controls the signal from the demultiplexer 23 and the multiplexer 24. For example, if the logical value for this bit is 1 it is the module 21 which is coupled to the bus 1, while if the logical value for this bit is 0 it is the terminator 22 which is coupled to the bus 1.

When the CPU turns off the power to the module 21, it orders the switch 25 to open, and also modifies the value stored in the array of registers 20 so that the bit of the register Ri changes from 1 to 0. The reverse operations are carried out when the CPU turns on or restores power to the module 21.

The general structure and layout of the terminator module 22 associated with the functional module 21 will now be described with reference to the diagram in FIG. 3.

The terminator 22 is a slave module. Similarly to the functional module 21 with which it is associated, it is coupled to the bus 1 via the five channels described in the AXI Specification, which are:

read address channel 31;
read data channel 32;
write address channel 33;
write data channel 34; and,
write response channel 35.

In addition, it receives a clock signal ACLK and an asynchronous reset signal ARESETn (the lowercase n indicates that this signal is active in the low logic state) from the bus 1.

This set of signals represents about 400 lines, depending on the size of the data channels. More information is available in the AXI specification cited above.

As the terminator does not process data, the data channels are in the "don't care" state. The same is true for the signal in the AXI protocol which indicates the size of the data, and the one which indicates the type of burst (a burst is a unit of data sent in response to a request and corresponds to a whole number of clock signal periods).

Some of the signals in the AXI protocol are not used by the terminator. The signals used are given in Table 1 below:

TABLE 1

| Name of Signal | Size | Type | Description |
|---|---|---|---|
| Clock and Reset | | | |
| ACLK | 1 | IN | AXI clock |
| ARESETn | 1 | IN | Asynchronous reset, active in the low state |
| Write address channel | | | |
| AWID | 4 | IN | Write address ID |
| AWVALID | 1 | IN | Write address valid |
| AWREADY | 1 | OUT | Write address ready |
| Write Data Channel | | | |
| WVALID | 1 | IN | Write valid |
| WLAST | 1 | IN | Last write transfer |
| WREADY | 1 | OUT | Write ready |
| Write Response Channel | | | |
| BID | 4 | OUT | Write response ID |
| BRESP | 2 | OUT | Write response |
| BVALID | 1 | OUT | Write response valid |
| BREADY | 1 | IN | Write response ready |
| Read Address Channel | | | |
| ARID | 4 | IN | Read address ID |
| ARLEN | 4 | IN | Burst length |
| ARVALID | 1 | IN | Read address valid |
| ARREADY | 1 | OUT | Read address ready |
| Read Data Channel | | | |
| RID | 4 | OUT | Read ID |
| RRESP | 2 | OUT | Read response |
| RVALID | 1 | OUT | Read valid |
| RLAST | 1 | OUT | Last read transfer |
| RREADY | 1 | IN | Read ready |

In this table, the name of the signal (referring to the AXI Specification) is given in the first column, its length in bytes is given in the second column, its type ("IN" for an incoming signal and "OUT" for an outgoing signal) is given in the third column, and its description is given in the fourth column.

The binary length of the signals ARID, AWID, RID, WID and BID can be configured using templates and parameters, which it is unnecessary to detail further. We will simply note that the user can choose the value of the parameter ID_WIDTH which defines the length in bytes of the id labels on the bus. The default value is one byte. The value of the parameter ID_MAX, which defines the upper limit of the length (in bytes) for id labels on the bus is calculated automatically based on the parameter ID_WIDTH defined by the user.

Figure 3:
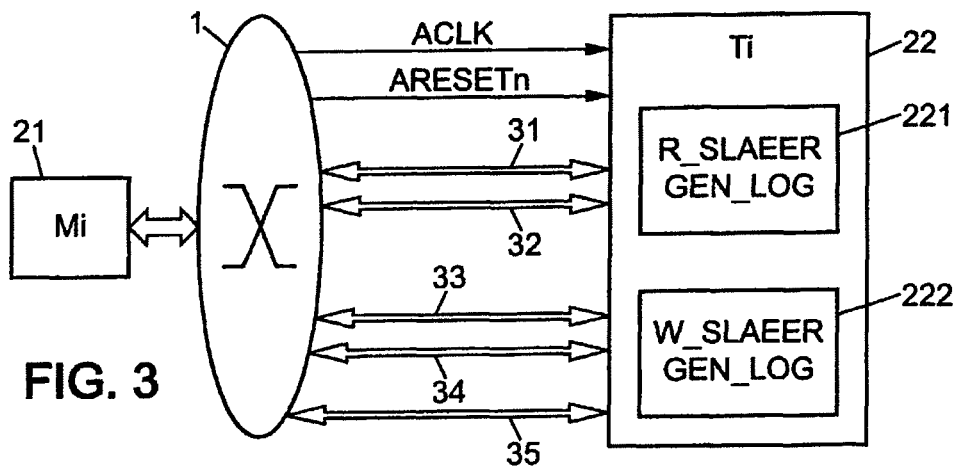
FIG. 3 shows in more detail the signals sent or received on the bus by the terminator module, and a simplified block diagram of said terminator module.

As illustrated in FIG. 3, the terminator comprises two sources for the error message SLVERR that it returns: a logic unit 221 for generating the error signal if a read operation is in progress, and a logic unit 221 for generating the error signal if a write operation is in progress. These two distinct cases refer to the transaction in progress at the moment the power is turned off, which calls for the sending of the message SLVERR by the terminator. The logic unit 221 is therefore activated when power to the functional module 21 is turned off while it is engaged in a read operation in slave mode. Conversely, the logic unit 222 is activated when power to the functional module 21 is turned off while it is engaged in a write operation in slave mode.

Figure 4:
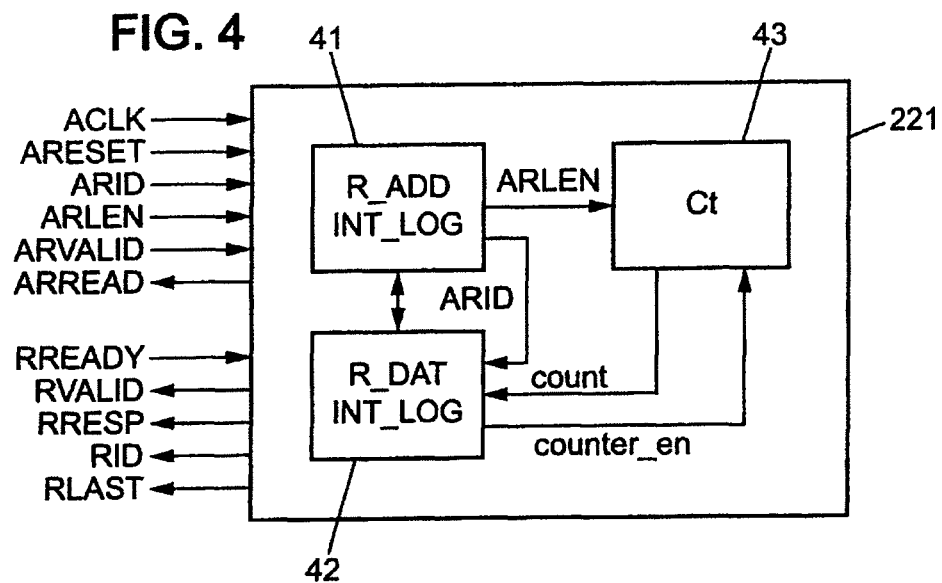
FIG. 4 is a block diagram of a first logic unit implemented in the terminator module.

FIG. 4 shows a block diagram of the logic unit 221 for generating the error message response if a read operation is in progress. In this figure, the signals sent or received by the logic unit 221 are represented on the left, with an incoming arrow for signals received and an outgoing arrow for signals sent.

The logic unit 221 is in charge of the operation of the read address channel and the read data channel. It comprises, for example, a read address interface logic block 41, a read data interface logic block 42, and a counter 43 (actually a down counter).

The block 41 is in charge of the operation of the read address channel 31 and the read data channel 32.

It loads the information present on the read address channel, activates the signal ARREADY, and reinitializes the initial value of the counter 43. For example, this reinitialization sets the current value of the counter 43 to a value N received in the signal ARLEN, where N is a non-zero whole number. The block 41 sends the signal ARLEN to the counter 43 for this purpose.

The block 41 also sends the signal ARID to the block 42, so that the latter knows the identifier ID of the master module which initialized the transaction, as said identifier is received in the signal ARID.

The block 42 sets the response signal RRESP to indicate the error message SLVERR, which corresponds to indicating that the slave mode is not available. It also generates the signal RVALID, as well as the signal RLAST based on the count value of the counter 43, denoted "readleft", that it receives from the counter 43. In an exemplary embodiment, the Verilog code corresponding to this function can be as follows:

assign iRLAST=(readleft==4'b0000)?1'b1:1'b0;
assign RLAST=iRLAST;

The block 42 generates a signal internal to the logic unit 221, denoted counter_en, which is a counter activation signal. This signal is for example the result of the logical AND operation between the signal RVALID, the signal RREADY, and the additional condition that the count value of the counter readleft is not equal to zero. When the signal counter_en is in the high state, the value readleft is decremented by one unit at each rising edge of the clock signal ACLK that is presented.

Figure 5:
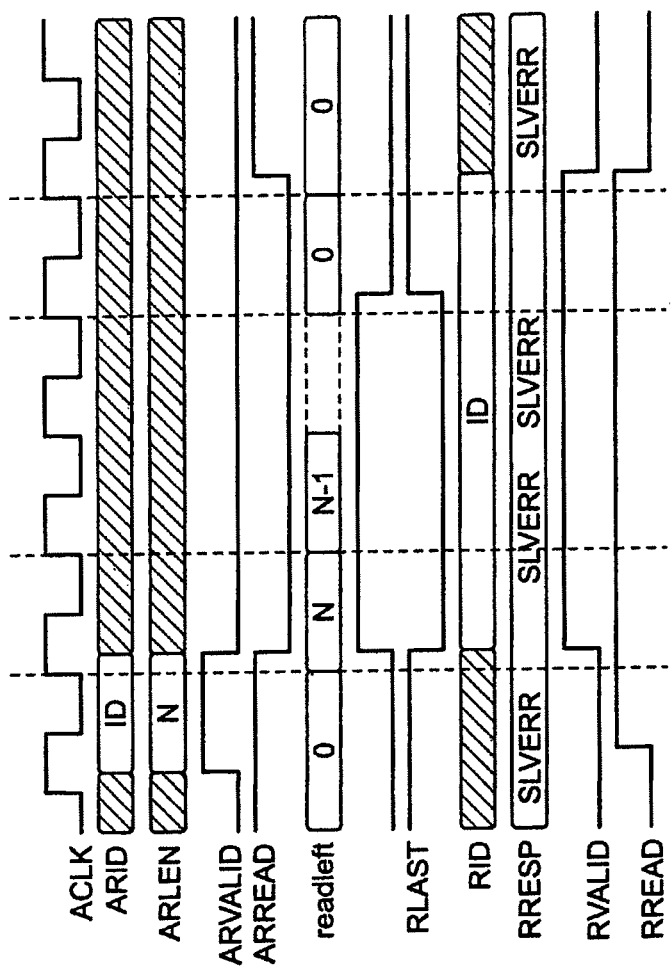
FIG. 5 shows a timing chart of the signals exchanged between the bus and the first logic unit of the terminator module.

The timing chart in FIG. 5 illustrates the timing of the different signals that are involved in, and/or are modified by, the operation of the logic unit 221. In this timing chart, the response messages and values carried by the signals have been indicated where applicable.

As we can see, the logic unit 221 is configured so that when a read operation is in progress in the functional module 21 at the moment when its power is turned off, the terminator 22 returns the response SLVERR on the read data channel for the entire duration of the response burst expected by the master module, meaning for N cycles of the clock signal ACLK (where N is the value received in the signal ARLEN).

In other words, this all occurs in a manner that is transparent to the master module that initiated the transaction, regardless of the moment when the power is turned off to the slave module 21 during the read transaction. The terminator operates such that, for the initiating module, everything proceeds as if the functional module 21 is still receiving power and is sending the error message SLVERR instead of read data, i.e. for the entire duration of the read response expected by the master functional module.

Figure 6:
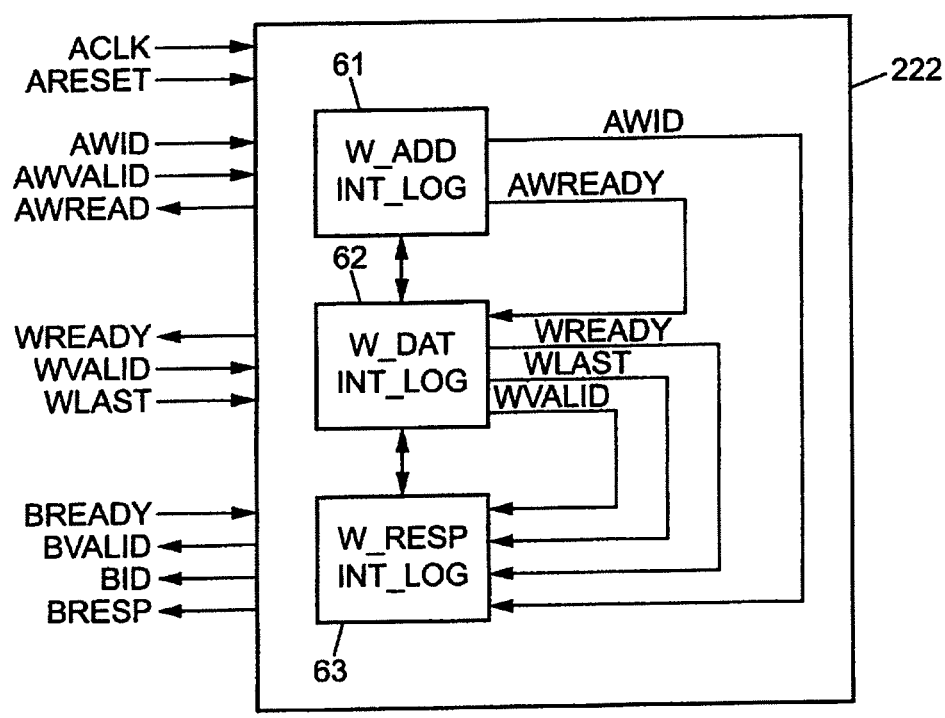
FIG. 6 is a block diagram of a second logic unit implemented in the terminator module.

FIG. 6 shows a block diagram of the logic unit 222 for generating the error message if a write operation is in progress. In this figure, the signals sent or received by the logic unit 222 are represented on the left, with an incoming arrow for signals received and an outgoing arrow for signals sent.

The logic means 222 is in charge of the operation of the write address channel 34, the write data channel 35, and the write response channel 33. It comprises a write address interface logic block 61, a write data interface logic block 62, and a write response interface logic block 63.

The write and data addresses are unimportant, as the write operation is not completed but is terminated by sending a response signal BRESP containing the error message SLVERR.

The block 61 and the block 62 respectively process, independently of each other, the write address channel signals 34 and the write data channel signals 35. The block 61 provides the signal AWREADY to the block 62 and the signal AWID to the block 63.

The block 62 provides the signal WREADY, the signal WLAST, and the signal WVALID to the block 63. The write response validation signal BVALID is generated there by sampling these three signals. When they are simultaneously in the high logic state, the signal BVALID is set to the high logic state. This indicates that the current write transaction is terminated.

Figure 7:
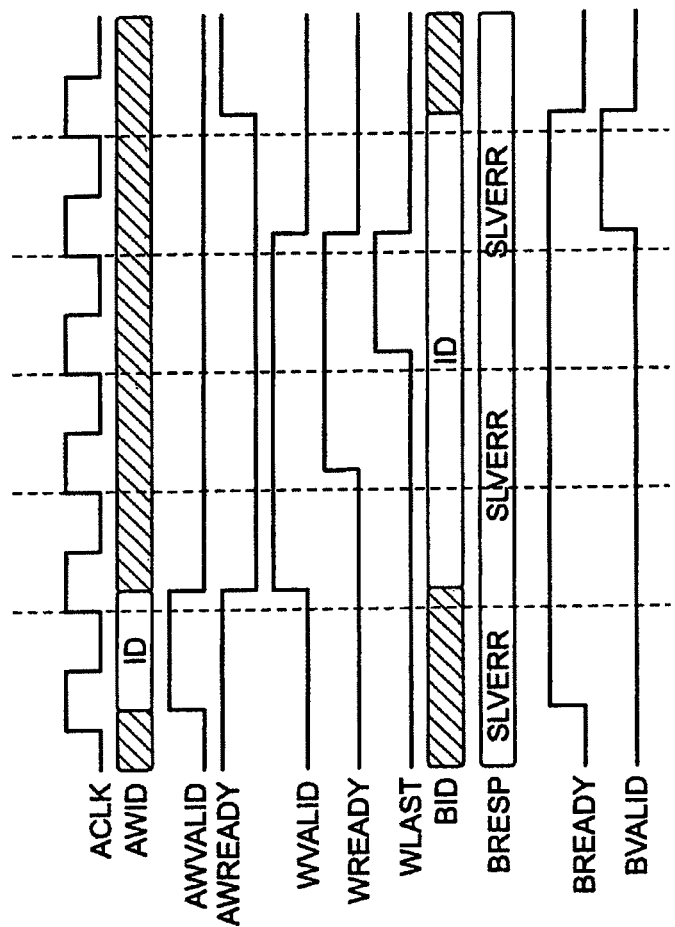
FIG. 7 shows a timing chart of signals exchanged between the bus and the second logic unit of the terminator module.

The timing chart in FIG. 7 illustrates the timing of the different signals which are involved in, and/or are modified by, the operation of the logic unit 222. In this timing chart, the response messages and values carried by the signals have been indicated where applicable.

Note that the sent signal BID is derived from the received signal AWID, in the sense that the first contains the value of the identifier ID received in the second.

In addition, the signal WREADY passes to the high state when the signal AWREADY passes to the low state, with a one cycle delay. The signal WREADY returns to the high state when the signal WVALID and the signal WLAST are simultaneously in the low state.

In other words, this all occurs in a manner that is transparent to the master module that initiated the transaction, regardless of the moment when the power is turned off to the slave module 21 during the current transaction. The terminator operates such that, for the initiating module, everything proceeds as if the functional module 21 is still receiving power and is itself sending the error message SLVERR after receiving the binary data to be written, i.e. at the end of receiving the write request.

Figure 8:
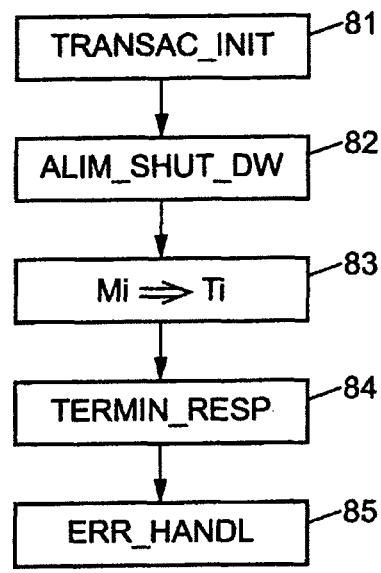
FIG. 8 is a step diagram of a method according to the second aspect.

The steps of a process according to embodiments of the invention are illustrated in FIG. 8.

In a step 81, a master functional module initiates a transaction with a slave functional module of a system-on-chip as described above. This can be a read request or a write request.

In a step 82, the CPU of the system-on-chip turns off the power to the slave functional module in order to save energy, not knowing that this functional module is involved in a transaction still in progress.

In a step 83, the terminator module T1 associated with the slave functional module M1 takes over for the slave functional module M1. As was described above, this occurs by uncoupling the slave functional module from the bus and coupling the associated terminator module to said bus.

In a step 84, the terminator module generates and sends a response to the request currently being processed. This response corresponds to an error message.

In a step 85, the master module which initiated the transaction by sending the request, receives and processes the error message. It is up to the software implemented in this master module to identify the cause of the received error message in a conventional manner and react accordingly.

Figure 9:
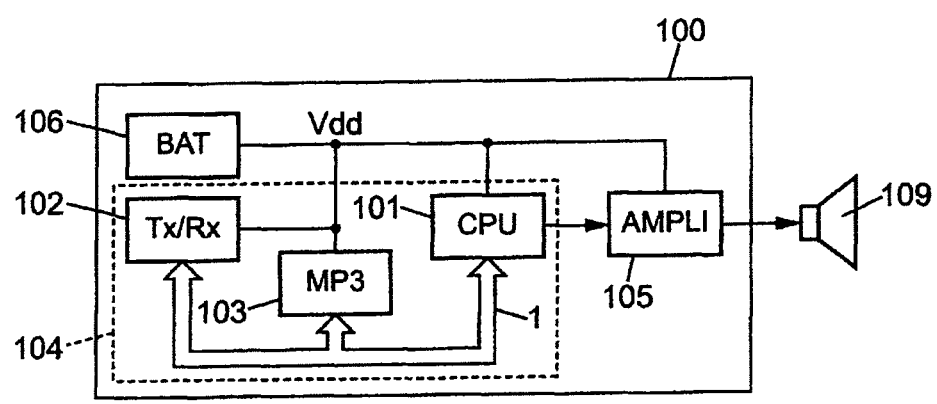
FIG. 9 is a block diagram of a device according to the third aspect, incorporating a system according to the first aspect.

The block diagram in FIG. 9 shows the elements of a device incorporating a system-on-chip as presented above. Such a device can be a mobile telephone or any other electronic device which may or may not be a communication device. This device typically operates on a battery, and power management intended to conserve battery power is therefore desirable.

The device 100 comprises a central processing unit 101, and a communication unit 102 for sending and receiving information from the outside, particularly by modulation of a radio frequency carrier. It also comprises a unit 103 for reading files in MP3 format (which are stored for example in a memory not represented), such as pieces of music. The unit 101 communicates with the unit 102 and the unit 103 via a communication bus 1. Each of these elements is powered by the supply voltage Vdd delivered by a battery 106.

In some embodiments, the control unit 101 is a CPU and the units 102 and 103 are functional modules of a system-on-chip 104, as described above. The system 104 generates an audio signal which, after amplification by an amplifier 105, is reproduced for the user via a speaker 109 for example.

The implementation of these embodiments reduces the current consumed by the elements of the system-on-chip 104, and therefore extends the autonomy of the device 100, meaning the length of time it can be used between two battery charges 106. Advantageously, this power savings is obtained with no risk of the system hanging because of a lack of response from a slave functional module involved in a transaction at the moment its power is turned off.

The invention has been described above with reference to certain embodiments. It is understood, of course, that any technically feasible variation falls within the context of the present application. In particular, although the invention has been described in the context of a system-on-chip (SoC), it is understood that the system can comprise elements in more than one integrated circuit, i.e. in more than one chip. In this case, the interconnection bus can comprise a bus interconnecting the different integrated circuits.

The invention claimed is:

1. A power management system, comprising:
   a central processing unit;
   an interconnection bus;
   a plurality of functional circuits corresponding to distinct power domains, able to communicate with each other, with the central processing unit, or both, via the interconnection bus, wherein the plurality of functional circuits includes a slave functional circuit and an associated master functional circuit; and
   a terminator circuit associated with a power domain of the slave functional circuit, and configured to be substituted for the slave functional circuit when the power to the power domain of the slave functional circuit is turned off by the central processing unit, and to signal an error to the master functional circuit in response to a request of a transaction that is in progress between the slave functional circuit and the master functional circuit at the moment the power is turned off;
   wherein the terminator circuit is decoupled from the interconnection bus when the slave functional circuit is coupled to the interconnection bus; and
   wherein the slave functional circuit is decoupled from the interconnection bus when the terminator circuit is coupled to the interconnection bus.

2. The system of claim 1, wherein the terminator circuit comprises a first logic circuit configured to produce a response signaling an error if a read operation is in progress at the moment the power is turned off, and to do so for the entire duration of the read response expected by the master functional circuit.

3. The system of claim 2, wherein the terminator circuit comprises a second logic circuit configured to produce a response signaling an error if a write operation is in progress at the moment the power is turned off, and to do so at the end of receiving the write request regardless of the moment at which the power to the slave functional circuit is turned off during the current transaction.

4. The system of claim 1, wherein the interconnection bus supports a combinational communication protocol, and wherein the error is signaled by activation of an error signal in compliance with the protocol.

5. The system of claim 1, wherein the interconnection bus supports a sequential communication protocol, and wherein the error is signaled in the form of an error message in compliance with the protocol.

6. A method of managing power in a system comprising a central processing unit, an interconnection bus, and a plurality of functional circuits corresponding to distinct power domains, the functional circuits being able to communicate with each other, with the central processing unit, or both, via the bus, the method comprising:
   substituting a terminator circuit associated with one of the power domains for a slave functional circuit of said power domain when the power to the associated power domain is turned off by the central processing unit, the substituting comprising coupling the terminator circuit to the interconnection bus; and
   signaling an error in response to a request of a transaction that is in progress between the slave functional circuit and an associated master functional circuit at the moment the power is turned off;
   wherein the terminator circuit is decoupled from the interconnection bus when the slave functional circuit is coupled to the interconnection bus; and
   wherein the slave functional circuit is decoupled from the interconnection bus when the terminator circuit is coupled to the interconnection bus.

7. The method of claim 6, further comprising:
   producing from the terminator circuit a response signaling an error if a read operation is in progress at the moment the power is turned off, wherein the terminator circuit produces the response for the entire duration of the read response expected by the master functional circuit.

8. The method of claim 6, further comprising:
producing from the terminator circuit a response signaling an error if a write operation is in progress at the moment the power is turned off, wherein the terminator circuit produces the response at the end of receiving the write request regardless of the moment at which the power to the slave functional circuit is turned off during the current transaction.

9. The method of claim 6, wherein the interconnection bus supports a combinational communication protocol, and wherein the terminator circuit signals the error in compliance with the protocol.

10. The method of claim 6, wherein the interconnection bus supports a sequential communication protocol, and wherein the terminator circuit signals the error in compliance with the protocol.

11. An electronic device comprising a power management system that includes:
a central processing unit;
an interconnection bus;
a plurality of functional circuits corresponding to distinct power domains, able to communicate with each other, with the central processing unit, or both, via the interconnection bus, wherein the plurality of functional circuits includes a slave functional circuit and an associated master functional circuit; and
a terminator circuit associated with a power domain of the slave functional circuit, and configured to be substituted for the slave functional circuit when the power to the power domain of the slave functional circuit is turned off by the central processing unit, and to signal an error to the master functional circuit in response to a request of a transaction that is in progress between the slave functional circuit and the master functional circuit at the moment the power is turned off;
wherein the terminator circuit is decoupled from the interconnection bus when the slave functional circuit is coupled to the interconnection bus; and
wherein the slave functional circuit is decoupled from the interconnection bus when the terminator circuit is coupled to the interconnection bus.

* * * * *